(No Model.)

H. A. DARRIN.
Self-Leveling Ship's Berth.

No. 231,284. Patented Aug. 17, 1880.

ATTEST:
S. A. Brown.
Jos. H. Denithorne.

INVENTOR:
Henry A. Darrin.
By his Attorneys.
Burke, Fraser & Connett

UNITED STATES PATENT OFFICE.

HENRY A. DARRIN, OF WEST NEW BRIGHTON, ASSIGNOR TO THOMAS W. BUTTS, OF PORT RICHMOND, NEW YORK.

SELF-LEVELING SHIP'S BERTH.

SPECIFICATION forming part of Letters Patent No. 231,284, dated August 17, 1880.

Application filed May 31, 1880. (No model.)

*To all whom it may concern:*

Be it known that I, HENRY A. DARRIN, of West New Brighton, Richmond county, New York, have invented certain Improvements in Self-Leveling Ships' Berths, of which the following is a specification.

This invention relates to that class of ships' berths which are intended to maintain a level, or nearly level, position, despite the rolling of the vessel; and the object is, in part, to provide the berth with a suitable counter-balance that shall occupy very little room and weigh as little as possible, and partly to so connect the upper and lower berths that one counter-balance may serve for both or all.

Heretofore, in providing berths for vessels arranged to maintain their proper level at all times in rough weather, as a preventive of sea-sickness, it has been customary in some cases to suspend the berth from above, so that it may swing, or to mount it on a kind of universal joint, and fix a large weight—sometimes weighing as much as seven hundred pounds—to the under side of the berth at the center. Other devices employing weights to counterbalance the berths have been proposed; but all, so far as I am aware, have been too complex or bulky to be satisfactory.

Most of these devices are intended to provide also against the pitching of the vessel, a provision I omit, as the berth is rarely thrown more than an inch or two out of level from this cause, and to preserve its level requires an amount of mechanism and extra space that I deem unnecessary.

In my construction I arrange the counter-balance or counter-balances under the end or ends of the berth, and hang them low down, so as to get the maximum of leverage. This enables me to use a much lighter weight, and to utilize nearly all of the space under the berth for the reception of baggage, or for other storage purposes. The reduction of the weight is an important matter on shipboard, as is well known, and economy in space is also desirable.

Where two or more berths are arranged one above another I connect all of them together by links or rods, so that the same counter-balance may serve for all.

Figure 1:
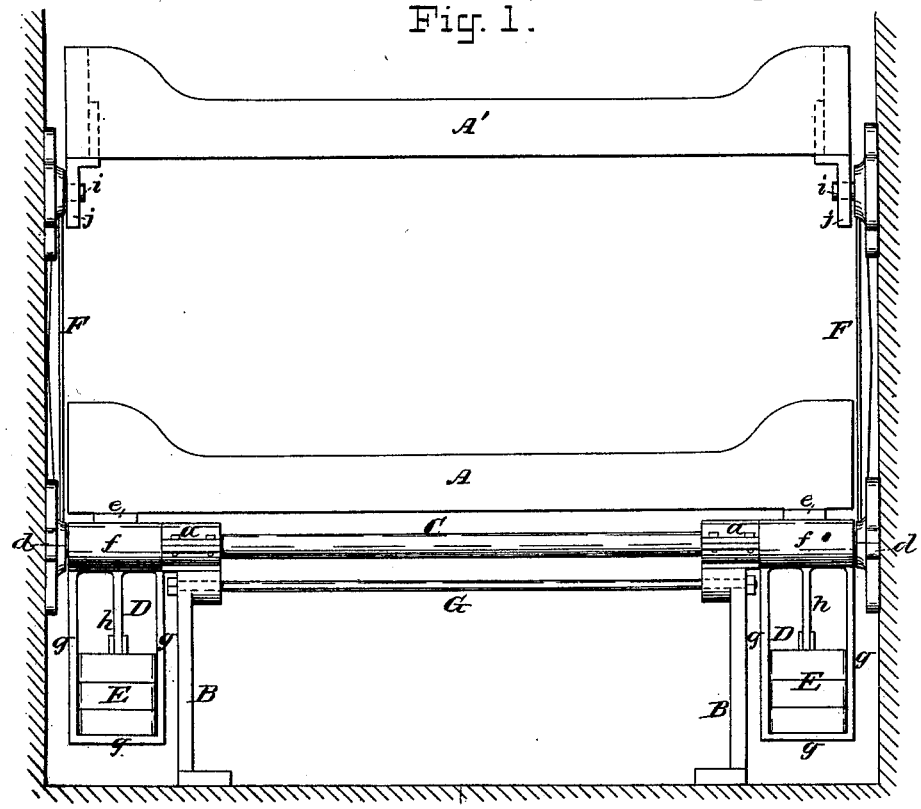
Figure 2:
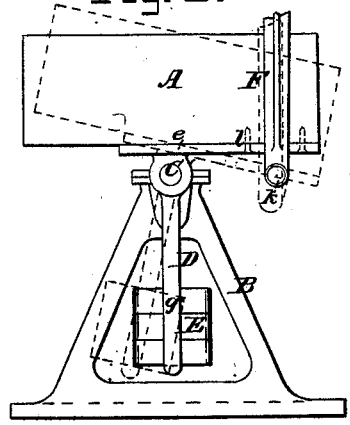
Figure 3:
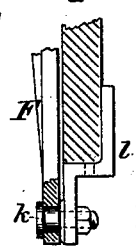

In the drawings, which serve to illustrate my invention, Figure 1 is a side elevation of an upper and lower ship's berth provided with my improvements, and Fig. 2 is an end view of the lower berth.

The remaining figures of the drawings are detail views on a larger scale, which will be more particularly referred to hereinafter.

Let A represent a lower, and A' an upper, berth in a vessel. I show only two, but there may be more than two, arranged one above another, in a state-room.

Figure 7:
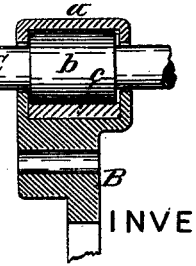

B B are supporting-frames, which may be of an A-shape, secured to the deck or floor. These have bearing-boxes $a$ $a$ to support a rock-shaft, C, on which are hung the counter-balances. I prefer to provide this shaft with collars or enlargements $b$, (see Fig. 7,) which form the bearings in the boxes $a$ $a$, and these bearings rest upon beds or linings $c$ $c$ of anti-friction metal.

Figure 4:
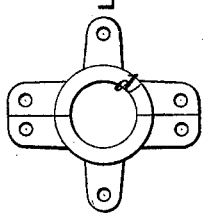

The ends of the shaft C rest in bearing-plates $d$ $d$, (shown enlarged in Fig. 4,) which are made in two parts and screwed to the bulk-heads or partitions between the rooms.

The shaft C bears on its ends metal frames D D, to receive and bear the counter-weights E E.

Figure 6:
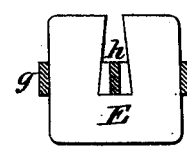

I prefer to construct the frame D in the following manner: I cast in one piece a bearing-plate, $e$, to receive the berth A, a tubular part, $f$, to embrace the shaft, a bail, $g$, to support the weight or weights, and a vertical bar, $h$, which passes through the weights. I may make the weight and frame D in one casting; but I find this makes them cumbersome and heavy, and troublesome to put in place. Therefore I prefer to make the frame as described and the weight in several parts, so as to be easily handled. To secure the weights properly in the bail, I prefer to slot the same, as shown in the plan view, Fig. 6, so as to form a sort of dovetail opening in each piece, and to give the central bar, $h$, for a part of the way, a corresponding shape. Thus, when the weight is pushed in on the bar near its top and then slipped down it cannot get off without it be first lifted up. Ribs of any form on the sides of the bar $h$, adapted to fit a corresponding opening in the weight, would serve the same purpose.

Figure 5:
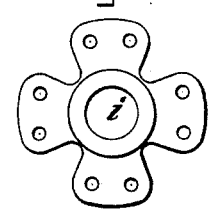

The upper berth, A', is hung on pivots or lugs $i$, (see enlarged in Fig. 5,) provided with flanges, by which to secure them to the partitions, and the ends of the berth are provided with perforated ears or bearing-pieces $j\ j$, which are arranged to receive the pins.

To connect the berths A A', I employ connecting-rods F F, which are joined to the berths by means of wrists $k$, secured to ears $l$, attached to the ends of the berths. There may be one or two of these rods at each end of the berth; but I think one will be sufficient, or a single connecting-rod for both of the berths might serve the purpose; but the strain is better equalized by supplying one at each end, and to prevent the berth from being wrenched by unequal strains I prefer to connect the plate $e$ of the frame D with the ear $l$, either by casting all in one piece or by connecting them rigidly. In Fig. 2 they are shown as made in one piece.

The bearing $a$ serves as a cup to retain oil for lubricating the bearings, and the sides of the box prevent the shaft C from moving endwise.

G is a tie-rod which connects the two supporting-frames B B together and adds to the rigidity of the structure.

It will be observed that I have an open space under the berth, between the supporting-frames B, wherein to stow baggage, &c., and that the counter-weights are at the ends, out of the way.

The weights E being at the end of the long arm of a lever fulcrumed at $f$, it will be seen that a very light weight may be employed, it being only required to counterbalance the weight of the occupant of the berth, and the weight may, if desired, be reduced at pleasure.

Having thus described my invention, I claim—

1. A ship's berth mounted upon a rock-shaft which extends longitudinally under the center of the berth and has bearings in or on the bulk-heads or partitions, as shown, and which is provided with counter-weights suspended under its ends, next to the partitions, to maintain the berth in a horizontal position, the object being to leave a clear space under the middle of the berth for stowage, as set forth.

2. The combination, with a berth, of the rock-shaft C, mounted in bearings at $a$ and $d$ in the supports B and the partitions, respectively, the said supports, the frames D, fixed to the rock-shaft at its ends between the bearings $a$ and $d$, and the weights, all arranged substantially as shown.

3. As a mounting for a ship's berth, the supports B B, provided with bearing-boxes $a\ a$, the shaft C, provided with collars or enlargements $b\ b$, the bearing-plates $d\ d$, the frames D, provided with a plate, $e$, bail $g$, and bar $h$, and the weights E E, all arranged substantially as and for the purposes set forth.

4. The combination of the berths arranged one above the other, the upper berth or berths mounted on lugs or pivots $i\ i$, and the lower one mounted on the rock-shaft C, the said rock-shaft, the connecting-rods F F, pivoted on wrists $k\ k$ on the berths, arranged in the same horizontal plane with the pivotal axes of the berths, the supports B B, the frames D D, and the weights E E, all arranged substantially as and for the purposes set forth.

5. The frame D, for supporting the weights, consisting of the plate $e$, tubular boss $f$, bail $g$, and bar $h$, in combination with the weight or weights E, having a dovetail opening, or its equivalent, to fit the bar $h$ and prevent the weights from slipping out of the bail, substantially as and for the purposes set forth.

In witness whereof I have hereunto signed my name in the presence of two subscribing witnesses.

HENRY A. DARRIN.

Witnesses:
OLE H. HOLBERG,
HENRY CONNETT.